United States Patent [19]

Eirich et al.

[11] Patent Number: 4,744,829
[45] Date of Patent: May 17, 1988

[54] PROCESS FOR PRODUCING AGGLOMERATES WHICH ARE RESISTANT TO LEACHING OUT

[76] Inventors: Hubert Eirich, Sandweg 16; Paul Eirich, Bahnhofstr. 11; Walter Eirich, Spessartweg 16, all of 6969 Hardheim, Fed. Rep. of Germany

[21] Appl. No.: 884,555

[22] Filed: Jul. 11, 1986

[30] Foreign Application Priority Data

Jul. 13, 1985 [DE] Fed. Rep. of Germany ....... 3525111

[51] Int. Cl.$^4$ ........................... C04B 7/02; C02F 1/68
[52] U.S. Cl. .................... 106/97; 106/118; 106/DIG. 1; 210/751
[58] Field of Search ................... 106/97, DIG. 1, 118, 106/84; 210/751

[56] References Cited

U.S. PATENT DOCUMENTS

| | | | |
|---|---|---|---|
| 3,383,228 | 5/1968 | Rekate et al. | 106/97 |
| 3,734,988 | 5/1973 | Aintablian | 106/97 |
| 4,054,463 | 10/1977 | Lin | 106/97 |
| 4,209,335 | 6/1980 | Katayama et al. | 106/97 |
| 4,210,457 | 7/1980 | Dodson et al. | 106/97 |

*Primary Examiner*—William R. Dixon, Jr.
*Assistant Examiner*—Anthony Green
*Attorney, Agent, or Firm*—Paul & Paul

[57] ABSTRACT

A process for the production of agglomerates which are resistant to leaching out, from finely divided waste materials, is characterized in that a hydraulic binding agent is dissolved in water under a condition of forced mixing until it substantially no longer sediments, the resulting aqueous colloidal solution is combined with the finely divided waste materials and in so doing the water content of the mixture is adjusted to an agglomeratable consistency, the mixture is agglomerated through mixing, and then hardened.

21 Claims, No Drawings

PROCESS FOR PRODUCING AGGLOMERATES WHICH ARE RESISTANT TO LEACHING OUT

BACKGROUND OF THE INVENTION

Constantly increasing environmental awareness means that more and more waste materials which hitherto were normally dumped freely are now recognized as being harmful to the environment. For example it was conventional practice in the past to dump ashes from refuse incineration plants or from sewage sludge incineration as well as filter dusts in either storage areas which were specifically provided for that purpose, or on normal refuse dumps. However recent knowledge has shown that toxic substances such as heavy metals are washed out of such ashes and dusts during storage thereof by rain water, and become distributed in the water table.

The underlying object of the present invention was therefore that of providing a process for producing dumpable agglomerates of finely divided waste materials, in which a high degree of resistance to leaching out is achieved with the minimum amount of binding agent and thus at a minimum level of cost.

SUMMARY OF THE INVENTION

The process according to this invention, for the production of agglomerates which are resistant to leaching out from finely divided waste materials, is characterised in that a hydraulic binding agent is dissolved in water under a condition of forced mixing until it substantially no longer undergoes sedimentation. The resulting aqueous colloidal solution is then combined with the finely divided waste materials. By so doing the water content of the mixture is adjusted to an agglomeratable consistency, the mixture is agglomerated through mixing and then hardened.

The use of a hydraulic binding agent which is dissolved to provide an aqueous colloidal solution gives substantial advantages over the prior art. The binding agent particles of such a colloidal solution are smaller than the usual particle sizes of finely divided waste materials (such as ashes from refuse incineration plants or sewage sludge incineration plants as well as filter dusts) so that each particle of waste material is enclosed by a thin layer of binding agent. Therefore each granule of the agglomerate comprises individual particles of the waste material to be dumped, with such particles each being encased by particles of binding agent. Therefore, even mechanical damage to such a granule does not make the waste material enclosed thereby accessible to the leaching-out action of rain water—as would be the case if the granule were encased as a whole by a binding agent layer.

Further advantages of using a hydraulic binding agent which is dissolved in a colloidal solution are that when the binding agent hardens, it gives a pore-free and watertight enclosure, which is in contrast to a normally processed hydraulic binding agent. That means that the present process results in agglomerates which are absolutely resistant to leaching out.

Yet another advantage of the process is that the above-discussed resistance to leaching-out is achieved with very small amounts of binding agent because a very thin film of binding agent is formed on the particles of the waste material to be dumped, and that film is sufficient to give resistance to leaching-out and to allow the individual particles to cake together to form dumpable agglomerates. Furthermore, the use of small amounts of binding agent results in an economical process, which is an aspect of particular significance in regard to disposal processes.

DESCRIPTION OF THE PREFERRED EMBODIMENTS

All hydraulic agents are considered to be acceptable, as the binding agent for the process according to the invention, insofar as they can be dissolved with water to provide colloidal solutions. Cement or lime are particularly preferred in this respect as the hydraulic binding agents.

By application of suitable shearing forces cement can be dissolved in water to form a colloidal solution which is of a gel-like consistency. That material is also referred to as colloidal cement.

The use of calcium hydroxide as the binding agent gives an advantage in that calcium hydroxide is generally even finer than cement so that calcium hydroxide is particularly suitable for very finely divided waste materials. It will be appreciated that it is also possible to use combinations of cement and lime, which is thought to be an attractive alternative, particularly when the material to be enclosed has a disadvantageous granular appearance where large pores remaining in the material need are to be filled by filling material.

The production of agglomerates in the process according to the invention is of particular advantage in regard to disposal. Such agglomerates can be transported without difficulty using conventional mechanical conveyor equipment and can thus be dumped in the usual fashion without any fear of dust being produced in the event of windy weather.

It has already been mentioned that relatively small amounts of binding agent are sufficient to produce coatings which are resistant to leaching out. Desirably, from 3 to 15% and preferably from 5 to 10% by weight of hydraulic binding agent is used, relative to the amount of the waste materials to be agglomerated. As the binding agents are also relatively inexpensive, it will be seen that the overall process is extremely economical in regard to the starting materials required.

The binding agent is dissolved with the amount of water sufficient for the necessary action of hydrating the binding agent. Therefore, an amount of water of from 10 to 50% and preferably from 25 to 35% by weight, with respect to the amount of hydraulic binding agent, is preferably used for the dissolution operation. It will be appreciated that it is also possible to use more water when dissolving the hydraulic binding agent, but that does not give any additional advantages. Rather this gives the disadvantage of an increased level of energy consumption and the need for larger vessels during the dissolution operation.

The dissolution operation is effected by virtue of the action of shearing forces on the aqueous suspension of the binding agent, as, for example, those generated in by vigorous stirring. The dissolution time depends on the amount of binding agent in the water and the strength of the shearing forces, that is to say the amount of energy applied. That operation is concluded when, when the shearing forces are stopped, that is to say when the stirring action is shut down, the solution mixture substantially no longer sediments but remains a stable colloidal solution.

After the hydraulic binding agent has been dissolved, the resulting colloidal solution is combined with the finely divided waste materials to be agglomerated, and the water content of the mixture is adjusted to an agglomeratable consistency. As the operation of dissolving the binding agent is generally preferably carried out with the minimum possible amount of water, it is usually necessary to add further water to the mixture prior to the agglomeration step. An agglomeratable consistency is generally attained when the mixture to be agglomerated contains from 5 to 30% and preferably from 10 to 20% by weight of water, with respect to the waste materials to be agglomerated.

The agglomeration operation can basically be carried out with any desired positive or forced mixer with which, as is known, a pelleting operation can be carried out.

The operation of dissolving the hydraulic binding agent can be carried out in a separate apparatus outside the mixing granulator. It is also possible, however, to perform the step of dissolving the binding agent and the granulation operation in the same item of equipment, by using a mixing granulator with variable speeds of rotation. In the first phase of dissolving the hydraulic binding agent, such a mixing granulator operates at a high speed whereas it operates at a low speed in the second agglomeration phase.

So that the agglomerates are such that they can be transported, they must be hardened. When using calcium hydroxide as the binding agent, the hardening or setting step can be accelerated by a feed of carbon dioxide as that causes the calcium hydroxide to be carbonized to form $CaCO_3$. Firing or furnace waste gases can be used as the carbon dioxide source.

Hardening of colloidal cement is effected by chemical reactions which are known per se in relation to cement.

The rate of hardening or setting of the hydraulic binding agent may be increased by the application of heat. The heat may also be applied during the mixing and agglomeration operations: through introducing hot water or steam; by using hot waste materials (i.e. the material to be agglomerated) such as fly dust from electrical filters; or by introducing heat from firing or furnace equipment which is generally to be found at the processing plant. By virtue of heating thusly the temperature of either the colloidal solution of the hydraulic binding agent, or, subsequently the entire mixture can be raised (for example to a temperature of from 50° to 60° C.) which will result in relatively rapid development of the necessary initial strength. This is particularly more rapid than application of heat from the exterior.

If an additional application of heat from the exterior is required in a colder climate, that may be done by using the waste heat from the adjacent firing installation. Various possibilities present themselves in that respect. For example, the chamber or container in which hardening of the agglomerates occurs may be supplied with steam which was produced by the waste gases from the firing equipment. Fresh air may be heated up by the waste gases from the firing equipment in a heat exchanger and blown into the hardening chamber in the form of hot air. Water is desirably also introduced into the hardening chamber, with the hot air, in order to preserve the air humidity required for the cement to set. When using lime or calcium hydroxide as the binding agent and/or filler, carbon dioxide may also be passed directly from the waste gases into the hardening chamber.

The duration of the setting or hardening operation depends on the desired strength level as well as the hardening variables such as temperature, concentration of $CO_2$, and so forth.

Generally, the length of the hardening period is in a range of from 2 to 10 hours, when heat is applied. Without heat being applied, it may be up to 20 hours or more.

The setting or hardening operation is advantageously carried out in a chamber which is separate from the mixing granulator. For that purpose the freshly produced agglomerates may desirably be conveyed into a closed hardening chamber in containers such as pallet baskets, mesh boxes or the like, and in the hardening chamber may be exposed to variables which are necessary or desirable for hardening purposes, i.e., temperature, humidity content, $CO_2$ content and so forth.

The waste materials to be agglomerated such as ash or filter dust, generally and in regard to the present process preferably, have a particle fineness such that 50% of the grains are of a diameter of at most 100 $\mu$m, preferably at most 50 $\mu$m and particularly at most 30 $\mu$m. In comparison, the particle sizes of the hydraulic binding agents in the colloidal solution are considerably smaller, on the order of magnitude of about 0.01 $\mu$m.

If the waste materials to be agglomerated are ashes or in particular fly dust from electrical filters, the temperatures thereof are mostly above 150° C. To avoid adverse effects with regard to the hydraulic binding agent, the temperature should be below 100° C. and preferably around 60° C. In order to achieve these temperatures, the waste material may first be introduced into a mixing granulator. The temperature is reduced below 100° C. by the addition of an additional amount of cooling water and the resulting evaporation of water. The addition of the cold colloidal solution then gives a mixture temperature in the range of from 50° to 60° C.

If particularly temperature-sensitive cements are used, it is then possible to deliver a part of the agglomerating water together with the cooling water, instead of with the colloidal solution of the colloidal cement. In that way cooling of the waste materials to be agglomerated is effected (to 70° to 80° C., for example) not only by evaporation but also by a simple mixing effect by virtue of the addition of additional water. This is advantageous in that the colloidal cement, upon the addition operation being carried out, already encounters a finely divided waste material at lower temperature.

The process according to the invention may be carried out in one or two stages. In the case of the two-stage mode, hydraulic binding agent and fresh water are dissolved to form a colloidal suspension in a tar mixer. The colloidal suspension is then introduced into an agglomerating mixer, together with the waste dust material to be agglomerated. In that mixer, the waste dust particles are intensively encased by the binding agent, and formed into agglomerates.

If more moisture is required for agglomeration purposes than was used for dissolving the hydraulic binding agent, additional water is added in the agglomerating mixer. That water may also be non-drinkable water usually used for industrial and like purposes. If ashes from incinerator installations are used, cooling to temperatures below 100° C. is frequently necessary. In that case, during the dissolution operation, in the initial mixer, the ashes may first be mixed with cooling water and fed together therewith to the agglomerating mixer.

The water evaporates when mixing with the hot waste material and cools it to the necessary temperature of below 100° C. After such a cooling operation, the colloidal binding agent solution can be added. Cooling of the ash and preparation of the colloidal binding agent solution may thus occur simultaneously.

The pellets or granules produced in the agglomerating mixer are introduced into containers and passed into the hardening chamber where hardening is carried out, possibly with the application of heat and/or the feed of $CO_2$ in the form of waste gases, vapour or hot air.

The agglomerates which are produced in that manner can be transported without danger and deposited on normal dumps. Such agglomerates can possibly also be used as additive or aggregate materials for the production of concrete.

When the process is carried out in a single-stage mode, it is performed using a single mixer for the operation of dissolving the hydraulic binding agent and for producing the agglomerates. For example, it is possible for that purpose to make use of what is referred to as an intensive mixer of known design in which the mixing tools operate in the first stage—when dissolving the binding agent—at an increased speed of rotation in order to generate the necessary shearing forces.

In the second stage the speed of rotation and possibly the direction of rotation of the tools is changed so that agglomerates are produced by the addition of the waste dust material, which is possibly filler. Hardening of the agglomerates occurs then in a separate hardening chamber, as described in relation to the two-stage process.

EXAMPLE 1

| Cement | 9 kg |
|---|---|
| Water | 18 kg (for hydration of the cement and as granulation moisture) |
| | 27 kg |
| Ash (cold) | 100 kg |
| | 127 kg |

In a high-speed mixing unit, 9 kg of cement are dissolved in colloidal form in 18 kg of water, until it no longer sediments out. The processing time for this operation is about 3 minutes. Thereafter, the speed of rotation of the mixing tools is reduced and 100 kg of ash is added. After suspension of the ash, a granulatable consistency is produced, which forms granules under the effect of low-speed suitable processing tools. About 0.5 minute is required for the suspension operation and about 3 minutes for the granulation operation. Emptying of the machines takes about 20 seconds.

EXAMPLE 2

| Cement | 7.5 kg |
|---|---|
| Water | 17.5 kg (for hydration of the cement and as granulation moisture) |
| | 25.0 kg |
| Ash (150° C.) | 100.0 kg + 2 kg of cooling water |
| | 125.0 kg |

Two separate machines are generally required when dealing with hot ash, as the ash must be cooled down to a temperature below 100° C. before coming into contact with the colloidal cement. With an ash temperature of higher than 100° C., the binding properties of the cement would be adversely affected.

In a separate small pre-mixer, 7.5 kg of cement is dissolved with 17.5 kg of water to form a colloid. The processing time required is about 3 minutes.

In parallel therewith, in a larger mixer, 100 kg of ash at a temperature of 150° C. is cooled to a temperature below 100° C. by the addition of about 2 kg of water. The water which is introduced into the ash evaporates almost completely when that cooling is done. Desirably the amount of water is slightly higher than the evaporation amount required so that the ash remains dust-free with a residual moisture content of from 1 to 2% until the colloidal cement is added. Cooling of the ash or evaporation of the water requires about 0.5 minute. After cooling is concluded, the colloidal cement is emptied from the pre-mixer into the primary mixer. Homogenization of the ash with the colloidal cement takes about 0.5 minute and the subsequent agglomeration operation takes about 3 minutes.

We claim:

1. A process for producing agglomerates from finely divided waste materials, which are resistant to leaching out, characterised in that a hydraulic binding agent is dissolved in water under a condition of forced mixing until it substantially no longer sediments; the resulting aqueous colloidal solution is combined with the finely divided waste materials and in so doing the water content of the mixture is adjusted to an agglomeratable consistency; the mixture is agglomerated through mixing, and then hardened.

2. A process according to claim 1 characterised in that the hydraulic binding agent used is either cement or lime or a combination thereof.

3. A process according to claim 1 characterised by using from 3 to 15% by weight with respect to the waste materials to be agglomerated, of hydraulic binding agent.

4. A process according to claim 3 characterised by using from 5 to 10% by weight of hydraulic binding agent with respect to the waste materials to be agglomerated.

5. A process according to claim 1 characterised by adjusting the water content of the mixture to from 5 to 30% by weight with respect to the waste materials to be agglomerated.

6. A process according to claim 5 characterised by adjusting the water content of the mixture to equal from 10 to 20% by weight with respect to the waste materials to be agglomerated.

7. A process according to claim 1 characterised in that the hydraulic binding agent is dissolved with from 10 to 50% by weight of water, with respect to the hydraulic binding agent.

8. A process according to claim 7 characterised in that the hydraulic binding agent is dissolved with from 25 to 35% by weight of water with respect to the hydraulic binding agent.

9. A process according to claim 1 characterised in that the waste materials are used in a finely divided form such that 50% of the grains are at most 30 $\mu$m in diameter.

10. A process according to claim 1 characterised in that the agglomerates are hardened with the application of heat.

11. A process according to claim 10 characterised in that the agglomerates are hardened with the application of heat for a period of from 2 to 10 hours.

12. A process according to claim 1 characterised in that hardening is effected with the application of a feed of $CO_2$.

13. A process according to claim 1 characterised in that heat is supplied during the mixing operation.

14. A process according to claim 13 characterised in that said heat is in the form of steam.

15. A process according to claim 1 characterised in that, when using hot finely divided waste materials, said waste materials are cooled prior to the mixing operation with the dissolved hydraulic binding agent, to a temperature of below 100° C.

16. A process according to claim 15 characterised in that said waste materials are cooled prior to the mixing operations with the dissolved hydraulic binding agent to a temperature between 50° to 80° C.

17. A process according to claim 1 characterised in that the finely divided waste materials used are ashes from refuse or sewage sludge incineration plants or filter dusts.

18. A process according to claim 17 characterised in that said waste material consists of those with heavy metal contents.

19. A process according to claim 1 characterised in that the said 50% of said waste materials are, at most, 50 $\mu$m in diameter.

20. A process according to claim 1 characterised in that the said 50% of said waste materials are, at most, 100 $\mu$m in diameter.

21. A process according to claim 1 characterised in that hardening is effected with a combination of heat and a feed of $CO_2$.

* * * * *